US006218955B1

(12) United States Patent
Conklin

(10) Patent No.: US 6,218,955 B1
(45) Date of Patent: Apr. 17, 2001

(54) INFRARED LINK FOR SECURITY SYSTEM

(75) Inventor: Peter S. Conklin, Vergennes, VT (US)

(73) Assignee: Harrow Products, Inc., Woodcliff Lake, NJ (US)

( * ) Notice: Subject to any disclaimer, the term of this patent is extended or adjusted under 35 U.S.C. 154(b) by 0 days.

(21) Appl. No.: 08/796,788

(22) Filed: Feb. 6, 1997

Related U.S. Application Data

(60) Provisional application No. 60/011,263, filed on Feb. 7, 1996.

(51) Int. Cl.[7] .......... H04Q 1/00

(52) U.S. Cl. .......... 340/825.31; 70/278; 359/109; 340/825.72

(58) Field of Search .......... 340/825.31, 825.69; 359/109; 70/278

(56) References Cited

U.S. PATENT DOCUMENTS

| | | | | |
|---|---|---|---|---|
| Re. 33,873 | * | 4/1992 | Romano | 340/825.31 |
| 3,337,992 | * | 8/1967 | Tolson | 340/825.69 |
| 3,812,403 | * | 5/1974 | Gartner | 340/825.31 |
| 4,760,393 | * | 7/1988 | Mauch | 340/825.31 |
| 4,770,012 | | 9/1988 | Johansson et al. . | |
| 4,802,353 | | 2/1989 | Corder et al. . | |
| 4,854,143 | | 8/1989 | Corder et al. . | |
| 5,083,122 | | 1/1992 | Clark . | |
| 5,109,222 | * | 4/1992 | Welty | 340/825.69 |
| 5,245,329 | * | 9/1993 | Gokcebay | 340/825.31 |
| 5,260,551 | * | 11/1993 | Wiik | 340/825.31 |
| 5,373,718 | * | 12/1994 | Schwerdt | 340/825.31 |
| 5,410,301 | * | 4/1995 | Dawson | 340/825.31 |
| 5,541,585 | * | 7/1996 | Duhame | 340/825.31 |
| 5,670,940 | * | 9/1997 | Holcomb | 340/825.31 |

* cited by examiner

*Primary Examiner*—Brian Zimmerman
(74) *Attorney, Agent, or Firm*—Alix, Yale & Ristas, LLP

(57) ABSTRACT

An infrared communication system provides a communication link between a stand-alone electrically controlled lock and a centralized control system. A module comprising a transmitter and a receiver is mounted in fixed position to the door frame. A second module comprising a transmitter and a receiver is mounted to the door.

5 Claims, 5 Drawing Sheets

| REF | VBAT | GND | DECOP CAP |
|---|---|---|---|
| U1 | 14 | 7 | C5 |
| U2 | 14 | 7 | C6 |
| U3 | 14 | 7 | C7 |
| U4 | 1 | 8 | C8 |

INFRARED LINK FOR SECURITY SYSTEM

This application claims the benefit of U.S. Provisional Application 60/011,263 filed on Feb. 7, 1996.

This invention relates to the field of door security systems. More particularly, this invention relates to an optical communication system for an integrated lock control system.

Devices which provide programmable access to individual electrically controlled door locks are well known in the field of door security systems. Door security systems generally employ either centrally controlled door locks or stand-alone door locks. Both types of door locks typically operate by requiring a user to enter a personal access code at an access code reader located at the site of the door. Entry of a valid access code initiates an unlocking sequence for passage by the user through the door.

Centrally controlled door locks are typically wired from the door location to a programmable central control console at a remote location. Centrally controlled lock systems generally entail increased installation costs when compared to other door security systems. For centrally controlled lock systems employing electrically controlled mortise and cylindrical locks, wiring is typically installed between the door frame and the door by use of a shielded communication cable at the hinged edge of the door. Lock system reliability can be compromised because communication cables between doors and door frames are susceptible to wear and can be exposed to tampering. Furthermore, for aesthetic reasons, a passage must be provided for the communication cable from the hinged edge through the door to the electrically controlled mortise or cylindrical lock. For solid doors, providing this passage is a relatively time-consuming and expensive requirement.

In response to the increased initial expense and other deficiencies of centrally controlled and wired lock systems, less centralized systems which are relatively inexpensive, easy to install and electronically sophisticated have been widely employed. For example, stand-alone electrically controllable locks may be installed at each door location. Such stand-alone systems are typically not wired through the door and are separately powered by on board batteries associated with the lock. Many stand-alone systems are programmable to provide a number of operational options and are capable of compiling usage information or an audit trail.

While there are a number of advantages of stand-alone systems, there are also a number of disadvantages. Each stand-alone door lock is individually and independently programmed with valid user access codes. Any audit trail information compiled must be individually and independently downloaded from each lock. Because each door lock is independent, security personnel are required to visit each door location. The individual programming and downloading process for each lock of the security system is inefficient.

It may also be desirable to program changes in valid user access codes relatively simultaneously to all locks in the security system so as to preclude inconsistent valid access codes at different doors for a common secured area. Furthermore, in order for the entire security system to remain effective and current, it is desirable to program access code updates as required. Security systems employing independently operable stand-alone locks may therefore prove unwieldy and inefficient for securing larger numbers of doors.

SUMMARY OF THE INVENTION

Briefly stated, the invention comprises an optical communication system for communicating between a stand-alone electrically controlled lock and a centralized lock control system.

In the preferred embodiment of the invention, the optical communication system comprises a network communication module having an infrared network transmitter and an infrared network receiver mounted in a fixed position relative to the door frame. The network communication module is integrated with a remote lock network or lock control console. A corresponding lock communication module having an infrared lock transmitter and infrared lock receiver is mounted to the door. The lock communication module is integrated with the stand-alone lock. The pairs of infrared transmitters and receivers are oriented in a manner such that when the door is in a closed position, the respective transmitters and receivers are in opposing line-of-sight relationship. The opposed pairs of transmitters and receivers provide bi-directional wireless communication between the stand-alone lock and the remote lock control console. This optical communication system employs the opposed pairs of infrared transmitters and receivers to transfer lock commands, access codes and audit trail data between the stand-alone lock and the remote lock control console. The stand-alone lock can therefore be programmed, monitored and accessed from the remote location of the lock control console for audit trail data.

The communication system further facilitates networking and the efficient integration of numerous stand-alone locks into a comprehensive lock system. The addition or deletion of user access codes from the entire lock system can be accomplished on a single occasion by the networking function provided by the optical communication system. Furthermore, individual stand-alone locks can be easily and immediately accessed for audit trail data from a central location.

An object of the invention is to provide an optical communication system that provides communication between a stand-alone type door lock and a remote lock control console.

Another object of the invention is to provide a lock communication system that does not require wire communication lines between a door frame and an associated secured door.

A further object of the invention is to provide a lock communication system wherein programming of a stand-alone door lock is accomplished without requiring the presence of security personnel at the door lock site.

A still further object of the invention is to provide a lock communication system capable of both centralized programming and audit trail compilation from multiple units of a stand-alone door lock system.

Another object of the invention is to provide a lock communication system for the networking of multiple independent stand-alone locks from a remote location.

These and other objects of the invention are readily apparent from the specification and the accompanying drawings.

DESCRIPTION OF THE PREFERRED EMBODIMENTS

Figure 1:
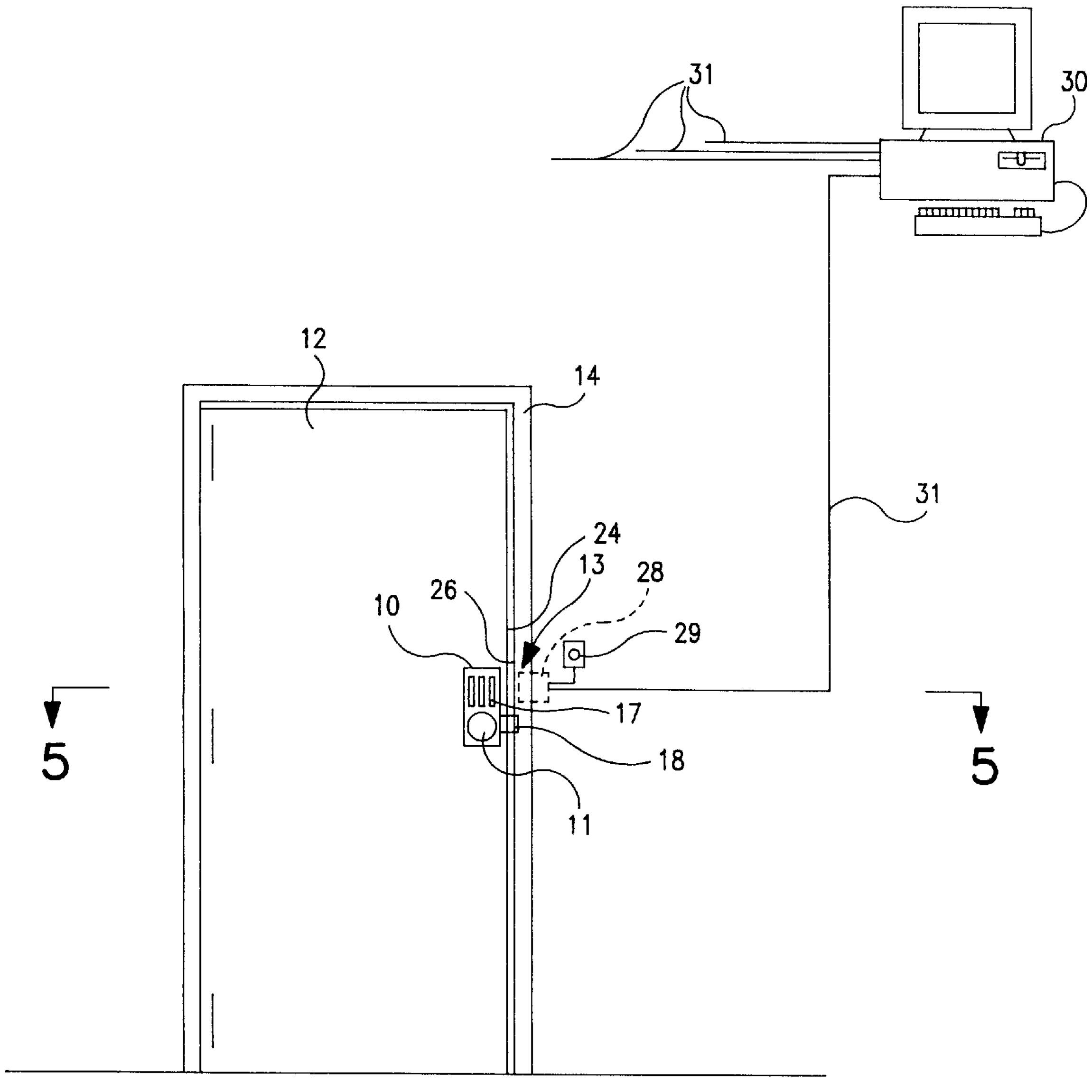
FIG. 1 is a front schematic view, partially in phantom, of the optical communication system of the invention in combination with an associated stand-alone lock, doorway and central control console.

With reference to the drawings, wherein like numerals represent like components throughout the figures, a stand-alone electrically controlled door lock is generally designated by the numeral 10. The stand-alone door lock 10 is mounted to a door 12 and latches to a door frame 14 for controlling access through the door 12.

The stand-alone lock 10 is preferably an electrically controlled mortise lock or cylindrical lock, but can comprise an electrically controlled electromagnetic lock or other electromechanical lock. The stand-alone lock 10 has a lock controller 16 and an electrically controlled lock mechanism 18 such as an electrically controlled latch. The stand-alone lock 10 preferably further has an on-board power source and an access code reader 17.

The access code reader 17 is preferably a numerical touch pad. A lock user enters a personal access code at the access code reader 17 to place the stand-alone lock in an unlocked state. The access code reader 17 may alternatively be a card reader, a contact activatable dataport or other system for receiving an access code. Access codes entered at the access code reader 17 are transmitted by the reader to the lock controller 16.

The lock controller 16 of the stand-alone lock 10 has a microprocessor and an associated on-board memory. The microprocessor compares an access code received from the access code reader 17 to a series of valid access codes stored in the on-board memory. If an appropriate comparison is obtained, the lock controller 16 generates a release signal. The release signal is transmitted by the lock controller 16 to the electrically controlled lock mechanism 18, thereby placing the stand-alone lock 10 into the unlocked state.

The lock controller 16 is programmable for the addition or deletion of valid access codes from the on-board memory. The lock controller 16 is also programmable with lock commands. Additionally, the lock controller 16 preferably compiles and stores an audit trail in the on-board memory. The audit trail may typically include listings of access codes entered at the access code reader 17, times corresponding to the entry of the access codes and other lock event information. Furthermore, the lock controller 16 is preferably further programmable for initiation of an alarm 15 upon entry of designated access codes and/or invalid access codes.

A central control console 30, preferably a computer, is employed for programming and networking multiple stand-alone locks 10. Security personnel can program the lock controllers 16 of particular stand-alone locks 10 with lock commands and access codes from the central control console 30. The lock controllers 16 can be programmed individually or as part of a predetermined set or subset of a network of lock controllers 16. The central control console 30 can also receive and display audit trail data from a designated lock controller 16. The central control console 30 may additionally be programmed to receive and display an alarm signal generated by a lock controller 16.

Figure 3:
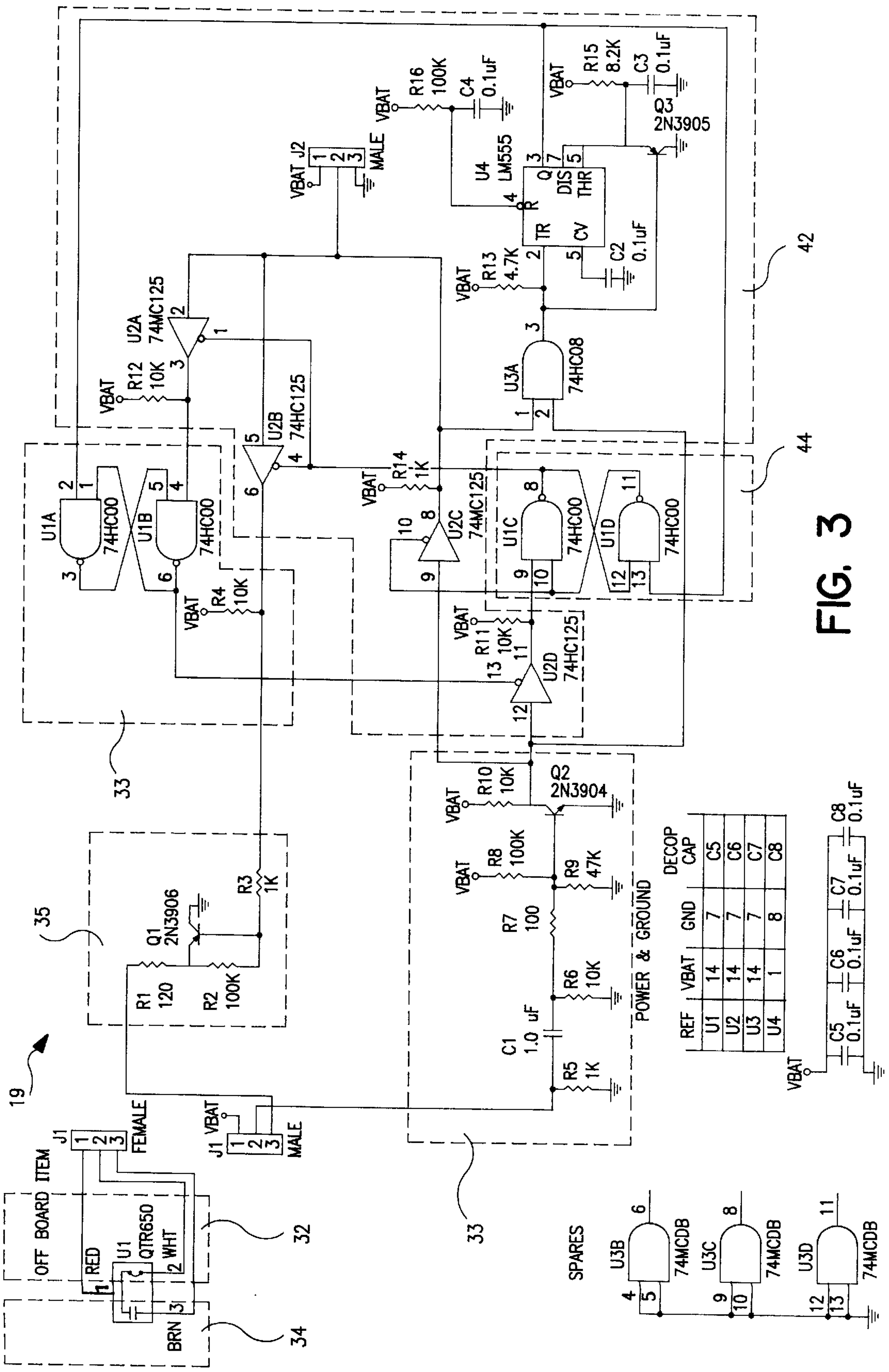
FIG. 3 is a partial schematic electrical diagram of a communication module of the optical communication system of FIG. 1.

The optical communication system 13 transmits lock commands, access codes, alarm signals and audit trail data between the lock controller 16 of the stand-alone lock 10 and the central control console 30. The optical communication system 13 comprises a lock communication module 19 and a network communication module 28. The lock communication module 19 and network communication module 28 preferably have a similar construction to provide reduced component manufacturing costs, modular application of the components, and simplified system maintenance. In the preferred form, each optical communication module 19, 28 is manufactured as a single electrical unit for compact and simplified construction (see FIG. 3).

The lock communication module 19 is wired to and communicates with the lock controller 16. The network communication module 28 is connected by a communication line 31 to and communicates with the central control console 30. The lock communication module 19 and network communication module 28 are in opposing line-of-sight positions wherein the lock communication module 19 is mounted to the movable door 12 and the network communication module 28 is mounted in a fixed position relative to the door frame 26.

The lock communication module 19 comprises an infrared lock transmitter 20 and an infrared lock receiver 22 mounted to the door 12. The infrared lock transmitter 20 and the infrared lock receiver 22 are preferably positioned for transmission and reception through the outside vertical door edge face 24 of the door 12. The lock transmitter 20 and lock receiver 22 are furthermore preferably located in the same mortise in the door 12 as the latch 18 and other components of the stand-alone lock 10 so as to minimize installation modifications to the door 12.

The network communication module 28 comprises an infrared network transmitter 34 and an infrared network receiver 32. The network communication module 28 is located in a fixed position relative to the door frame 14. The network transmitter 34 is positioned in opposing line-of-sight relation to the lock receiver 22, and the network receiver 32 is positioned in opposing line-of-sight relation to the lock transmitter 20. For applications wherein the lock communication module 19 is mounted to the door edge face 26, the corresponding network communication module 28 is mounted to the inside frame edge face 26 of the door frame 14. (See middle portion of FIG. 5). The infrared transmitters 20, 34 each employ an infrared LED.

Figure 6:
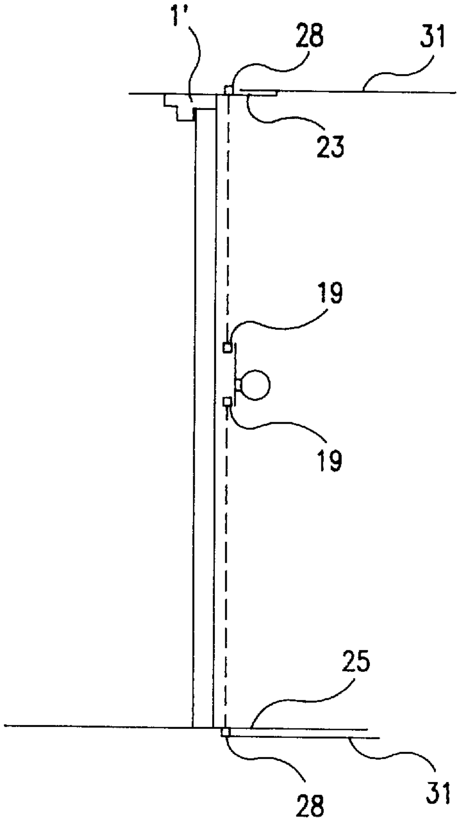
FIG. 6 is a partial longitudinal view of an alternate installation of the optical communication system of the invention with a doorway and a stand-alone lock.
Figure 5:
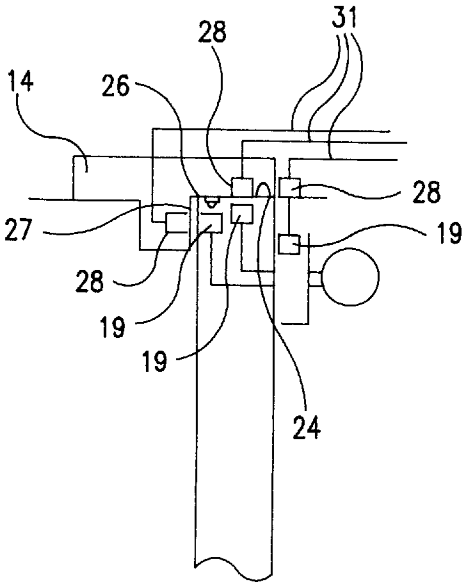
FIG. 5 is a partial cross-sectional view of the optical communication system, doorway and stand alone lock of FIG. 1 taken along the line 5—5 thereof.

The lock communication module 19 and the network communication module 28 can be positioned in several alternate opposing line-of-sight relationships wherein the lock communication module 19 and the network communication module 28 are mounted to the door and affixed relative to the door frame, respectively. With reference to FIG. 5, the lock communication module 19 can be mounted to a face of the door 12 and the network communication module 28 can be affixed to a rabbet 27 in the door frame 26. (See left portion of FIG. 5.) For stand-alone locks having a lock housing 11, the lock communication module 19 may be mounted to transmit and receive through the side of the lock housing 11. Therefore, the network communication module 28 will be mounted in a fixed position adjacent to the door frame 14. (See right portion of FIG. 5). Alternately, the lock communication module 19 may be mounted to transmit and receive through the top or bottom of the lock housing 11, and the network communication module 28 will be mounted in opposing line-of-sight position on a ceiling 23 or a floor 25, respectively. (See FIG. 6.)

Figure 2:
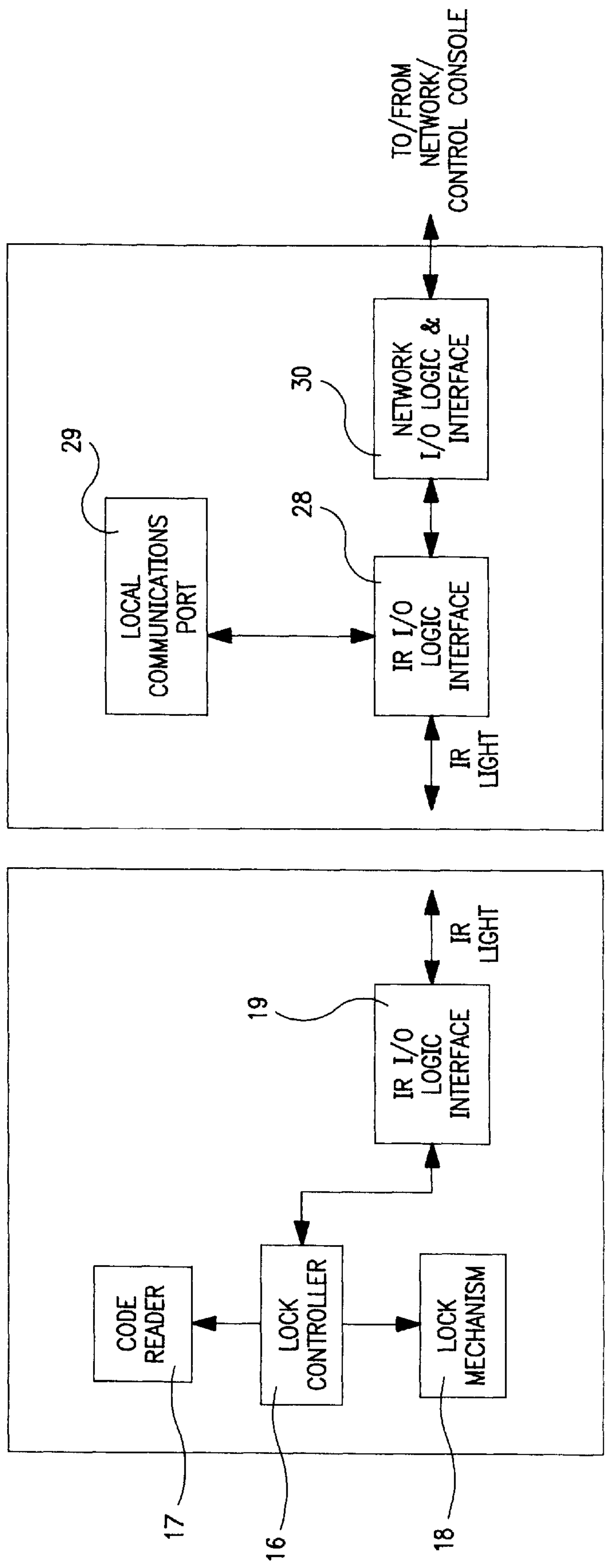
FIG. 2 is a partial block diagram of the optical communication system, lock, doorway and lock control console of FIG. 1.

During operation of the optical communication system 13, data, such as access codes or lock commands, is transmitted as an electrical signal from the central control console 30 to the network communication module 28 (see FIG. 2). The electrical signal from the control console 30 is converted into an optical signal by the network communication module 28, as described below. The optical signal is transmitted by the network communication module 28 to the lock communication module 19. The lock communication module 19 receives the optical signal, converts the optical signal to an electrical signal and finally transmits the electrical signal to the lock controller 16. By the reverse communication pathway, data, such as audit trail information, can be transmitted from the lock controller 16 to the central control console 30.

In the preferred embodiment of the optical communication system 13, the optical signal transferred between the lock communication module 19 and the network communication module 28 is an infrared beam. The transmission and reception of data embodied in the optical signal is accomplished by a standard RS 232 protocol or other protocol. In operation, the optical communication system 13 employs a half duplex code that allows only one transmission direction, either lock controller 16 to control console 30, or control console 30 to lock controller 16, to be active at any given time. The transmission and reception of data can occur in either direction from the lock controller 16 to the control console 30 or from the control console 30 to the lock controller 16.

Figure 4:
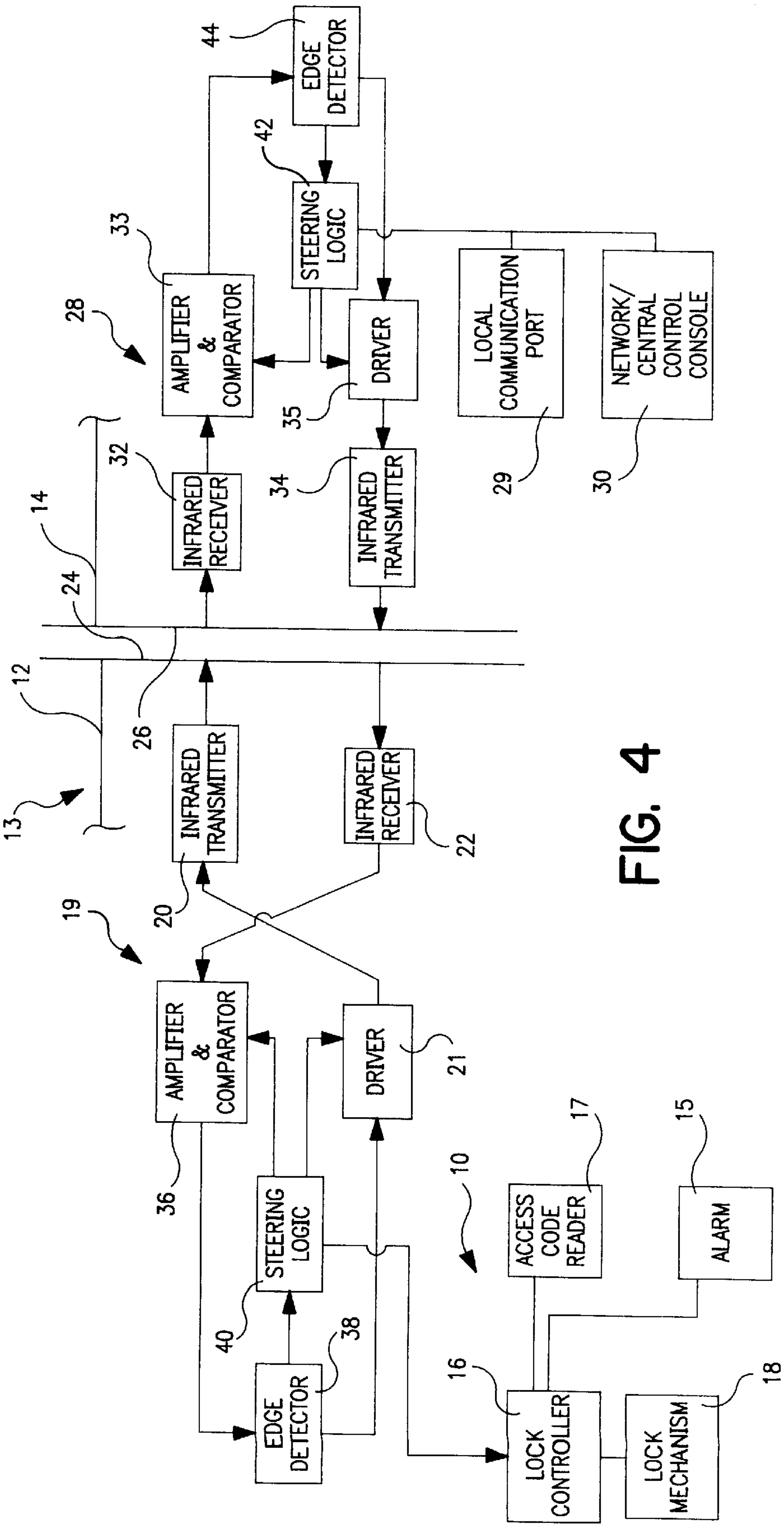
FIG. 4 is a detailed block diagram of the optical communication system, lock, doorway and lock control console of FIG. 1.

Data communications may originate from the control console 30 or the lock controller. The control console 30 signals the network communication module 28 to begin transmitting data (see FIG. 4). The network steering logic 42 of the network communication module 28 triggers thereby enabling the network transmitter 34 and disabling the network receiver 32. The data is transferred to a network driver 35 and is converted to an optical signal by the network transmitter 34. The optical signal is then transmitted by the network transmitter 34 to the lock receiver 22 of the lock communication module 19. The network edge detector 44 starts timing a period which detects the absence of data edges for a period no greater than one data byte transmission length. The lock receiver 22 detects the optical signal, and converts the optical signal to an electrical signal that is then sent to a lock amplifier/comparator 36.

The lock amplifier/comparator 36 amplifies and compares the electrical signal to a known reference value. The lock communication module 19 then triggers the lock steering logic 40 to enable the lock receiver 22 and disable the lock transmitter 20. The lock edge detector 40 of the lock communication module 19 starts a timing period which detects the absence of data for a period no greater than one data byte transmission length. When data transmission ceases, both the network edge detector 44 and the lock edge detector 38 time out reenabling both of the lock and network transmitters 20, 34 and both of the lock and network receivers 22, 32.

The lock controller 16 can also transmit audit trail data to the control console 30. The lock controller 16 will receive a command from the central control panel 30, via the communication path and in the manner previously disclosed, to begin transmitting audit trail data stored in the on-board memory. The lock steering logic 44 is triggered which enables the lock transmitter 20 and disables the lock receiver 22. A lock driver 21 receives the audit trail data and transmits an electrical signal of the data to the lock transmitter 20. The lock transmitter 20 converts the electrical signal to an optical signal and transmits the optical signal to the network receiver 32. The lock edge detector 38 of the lock communication system starts timing a period which detects the absence of data edges for a period of no greater than one data byte transmission length. The network receiver 32 detects and converts the optical signal to an electrical signal. The network amplifier/comparator 33 amplifies the electrical signal and compares the signal to a known reference value. The network communication module 28 then triggers the network steering logic 42 to enable the network receiver 32 and disable the network transmitter 34. The network edge detector 44 of the network communication module 28 then starts a timing period which detects the absence of data for a period no greater than one data byte transmission length. When data transmission ceases, both the lock and network edge detectors 38, 44 time out, reenabling both of the lock and network transmitters 20, 34 and both of the lock and network receivers 22, 32. This two-step, half-duplex process repeats until all data transmission between the lock controller 16 and the control console 30 has been completed.

The lock controller may also originate communications to the control console, for example, to indicate that an alarm condition or a low battery condition is detected. Communications with the lock controller 16 can also be initiated at the doorway by use of a local communication port 29. The local communication port 29 enables communication via the optical communication system 13 between a portable control console, such as a portable computer, and the stand-alone lock 10. The portable control console may therefore program and receive audit trail data from the lock controller 16.

It should be recognized that the optical communication system 13 of the invention can be employed in a lock system wherein the local communication port 29 receives access codes and transmits those access codes to the lock controller 16 for generating a release signal to the electrically controlled latch 18. Similarly, the local communication port 29 can receive and transmit access codes to the control console 30. The control console 30 can then signal the lock controller 16 for lock actuation by use of the optical communication system 13. A lock system of this construction and operation would only require the optical communication system 13 to operate in a single direction.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A door security system comprising:

a door frame;

a door pivotally mounted to said door frame, said door having a closed position;

control console means for generating data and transmitting and receiving said data in an electrical data form;

first optical communication means mounted to said door frame and electrically connected to said control console means, said first optical communication means for receiving a transmission of data in an optical data form and transforming said received optical data to said electrical data form and transmitting said data in said electrical data form to said control console means, and for receiving a transmission of data in said electrical data form from said control console means and transforming said received electrical data to said optical data form and transmitting said data in said optical data form;

second optical communication means mounted to said door in line of sight of said first optical communication means, said second optical communication means for receiving said data in said optical data form transmitted by said first optical communication means and transforming said received optical data form to said electrical data form and transmitting said data in said electrical data form, and for receiving a transmission of said data in said electrical data form and transforming said received electrical data form to said optical data form and transmitting said data in said optical data form to said first optical communication means; and lock means for securing said door to said door frame, said lock means comprising:

a self contained power supply, access code reader means for receiving access codes and transmitting said access codes, onboard memory means for storing said data, lock controller means for automatically controlling said lock means, wherein said lock controller means generates said data in said electrical data form transmitted to said second optical communication means and receives said data in said electrical data form transmitted by said second optical communication means and from said reader means.

2. The door security system of claim 1 wherein said data comprises audit trail data and said control console means receives said audit trail data from said lock controller.

3. The door security system of claim 1 wherein said data comprises lock status data and said control console means receives said lock status data from said lock controller.

4. The door security system of claim 1 wherein said data comprises at least one data type selected from the group consisting of lock commands, lock status information, valid user access codes, alarm signals and audit trail data.

5. The door security system of claim 1 wherein said first and second optical communication means receive and transmit said data in an optical data form within the infrared frequency band.

* * * * *